US 6,575,659 B1

(12) United States Patent
Valtwies et al.

(10) Patent No.: US 6,575,659 B1
(45) Date of Patent: Jun. 10, 2003

(54) CONICAL SCREW CONNECTION FOR MULTI-DISK SHAFT COUPLINGS

(75) Inventors: Ewald Valtwies, Sudlohn (DE); Stefan Uhlen, Haselunne (DE)

(73) Assignee: Atec-Weiss GmbH & Co KG, Vreden (DE)

( * ) Notice: Subject to any disclaimer, the term of this patent is extended or adjusted under 35 U.S.C. 154(b) by 0 days.

(21) Appl. No.: 09/500,275

(22) Filed: Feb. 8, 2000

(30) Foreign Application Priority Data

Feb. 8, 1999 (DE) .......................... 199 06 168

(51) Int. Cl.[7] .................... F16B 35/02; B23P 19/04; F16D 1/06
(52) U.S. Cl. .................... 403/370; 403/368; 403/374.1; 403/374.3; 403/1; 411/55
(58) Field of Search .................. 403/370, 368, 403/367, 334, 374.4, 374.3, 374.1, 373, 16, 1; 411/55

(56) References Cited

U.S. PATENT DOCUMENTS

| 1,472,565 | A | * | 10/1923 | Manning ................ 403/371 X |
| 3,803,691 | A | * | 4/1974 | Geese et al. ............ 403/374.4 |
| 3,851,482 | A | * | 12/1974 | LeTourneau et al. ....... 403/368 |
| 3,953,906 | A | | 5/1976 | Brown |
| 4,652,167 | A | * | 3/1987 | Garman ................ 403/16 X |
| 4,850,771 | A | | 7/1989 | Hurd |
| 5,190,393 | A | * | 3/1993 | Svensson ............... 403/16 X |
| 5,855,462 | A | * | 1/1999 | Weiss |
| 6,039,497 | A | * | 3/2000 | Gullberg ................ 403/16 |
| 6,179,537 | B1 | * | 1/2001 | Anders |

FOREIGN PATENT DOCUMENTS

| DE | 2445252 A | * | 5/1975 | |
| DE | 2832966 A1 | * | 2/1980 | |
| DE | 247490 A | * | 7/1987 | ............ F16B/3/06 |
| EP | 479736 | * | 9/1991 | |
| SE | 163969 | * | 11/1933 | |

* cited by examiner

Primary Examiner—Lynne H. Browne
Assistant Examiner—Ernesto Garcia
(74) Attorney, Agent, or Firm—Greenberg Traurig, P.C.

(57) ABSTRACT

A conical screw connection for multi-disk shaft couplings is described, having a tension bolt (1), a first spring collet (3) arranged on the tension bolt and having a collar (2), at least one second spring collet (5) having a collar (4) and supported by the first spring collet, with the disks of the multi-disk set being securable on said second spring collet, wherein the seat between the tension bolt and the first spring collet is conical, and the seat between the first spring collet and the second spring collet is cylindrical, and a tension element (7) which axially clamps the disks of the multi-disk set, where the tension bolt has a threaded borehole (8) for a screw (9) whose head (10) is supported on the tension element. To permit optimum clamping of the multi-disk set using the same tool for axial and radial clamping of the disks, it is proposed that a force fit or a transition fit (11) be formed between the tension bolt and the first spring collet such that by tightening the screw, the disks of the multi-disk set are first clamped axially, and then the spring collets (3, 5) are widened radially.

5 Claims, 1 Drawing Sheet

CONICAL SCREW CONNECTION FOR MULTI-DISK SHAFT COUPLINGS

BACKGROUND OF THE INVENTION

This invention concerns a conical screw connection for a multi-disk shaft coupling with a tension bolt, a first spring collet having a collar and arranged on the tension bolt, at least one second spring collet having a collar and supported by the first spring collet, so that disks of the multi-disk set can be secured on this second spring collet, with the seat between the tension bolt and the first spring collet being conical in shape and the seat between the first spring collet and the second spring collet being cylindrical in shape, and with a tension element clamping axially the disks of the multi-disk set, where the tension bolt has a threaded borehole for a screw whose head is supported on the tension element.

Such a conical screw connection is known from German patent application DE 196 25 318 A1. The tension element here consists of a nut which is screwed onto an outside thread provided on one end of the first spring collet, clamping the multi-disk set axially. On the outside, the nut is provided with grooves in which a suitable tool for tightening the nut can engage. Furthermore, the nut has a borehole through which is guided the screw, which can be screwed into the threaded borehole of the tension bolt and whose head is supported on the nut. After the disks of the multi-disk set placed between the collar of the second spring collet and the respective tension ring have been secured axially by tightening the nut, the screw provided for the tension bolt is tightened with another tool, pulling the tension bolt into the first spring collet and expanding it radially like the second spring collet, so that the ring of the multi-disk set is also clamped radially. This conical screw connection has proven essentially successful in practice.

The object of the present invention is to provide a conical screw connection which will permit optimal clamping of the multi-disk set while using the same tool for the axial and radial clamping of the disks.

This object is achieved with a conical screw connection of the type defined in the preamble by the fact that a force fit or a transition fit is formed between the tension bolt and the first spring collet in such a way that by tightening the screw, first the disks of the multi-disk set are clamped axially and then the spring collets are widened radially.

SUMMARY OF THE INVENTION

The conical screw connection according to the present invention is characterized in that the disks are first clamped axially by tightening the screw which is screwed into the threaded borehole of the tension bolt, so the disks are in tight contact and thus the prerequisite condition for optimum clamping of the multi-disk set is created. Then, by further tightening of the screw with the same tool, the tension bolt is pulled into the first spring collet, with both the first spring collet and the second spring collet arranged on the first being widened radially. Since the tool need not be replaced, this yields a simplified assembly.

In comparison with the conical screw connection known from German patent application DE 196 25 318 A1, the conical screw connection according to the present invention is also characterized by lower manufacturing costs, because it is no longer necessary to produce a thread on the first spring collet and the tension element clamping the disks axially. With the conical screw connection according to the present invention, the tension element can be clamped axially with respect to the second spring collet or the tension ring by means of the screw provided for the tension bolt.

The force fit or the transition fit of the conical screw connection according to the present invention is preferably formed by a cylindrical shoulder at the insertion opening of the first spring collet and by a cylindrical collar on the tension bolt, where the inside diameter of the cylindrical shoulder is slightly smaller than the outside diameter of the collar of the tension bolt. This design is simple and can be manufactured relatively inexpensively.

It is also advantageous if the depth of the shoulder is essentially equal to the width of the collar of the tension bolt. The maximum radial widening of the spring collets can be seen easily in this design, because in this condition, the end face of the tension bolt is flush with the end face of the first spring collet. Thus, a defined tightening of the conical screw connection can be ensured by monitoring the position of the end faces relative to one another.

According to a preferred embodiment, the tension element clamping the disks axially may have a base and a collar projecting beyond the base, said collar being supported on the collar of the second spring collet or a respective tension ring, and encompassing the end of the first spring collet with a radial clearance.

According to another preferred embodiment, the second spring collet may be provided with a tension ring, where the disks of the multi-disk set can be secured axially between the collar of the second spring collet and the respective tension ring.

For simple dismantling of the conical screw connection according to the present invention, it is advantageous if the tension bolt has another threaded borehole on the end opposite the first threaded borehole. The two threaded boreholes are preferably designed with the same dimensions. To dismantle the tension bolt clamped in the first spring collet, the screw threaded into the threaded borehole may be threaded into the opposite threaded borehole in combination with the tension element, with the tension element together with the screw then serving as an extractor tool.

The present invention is explained in greater detail below on the basis of a drawing illustrating one embodiment.

DETAILED DESCRIPTION OF THE DRAWINGS

Figure 1:
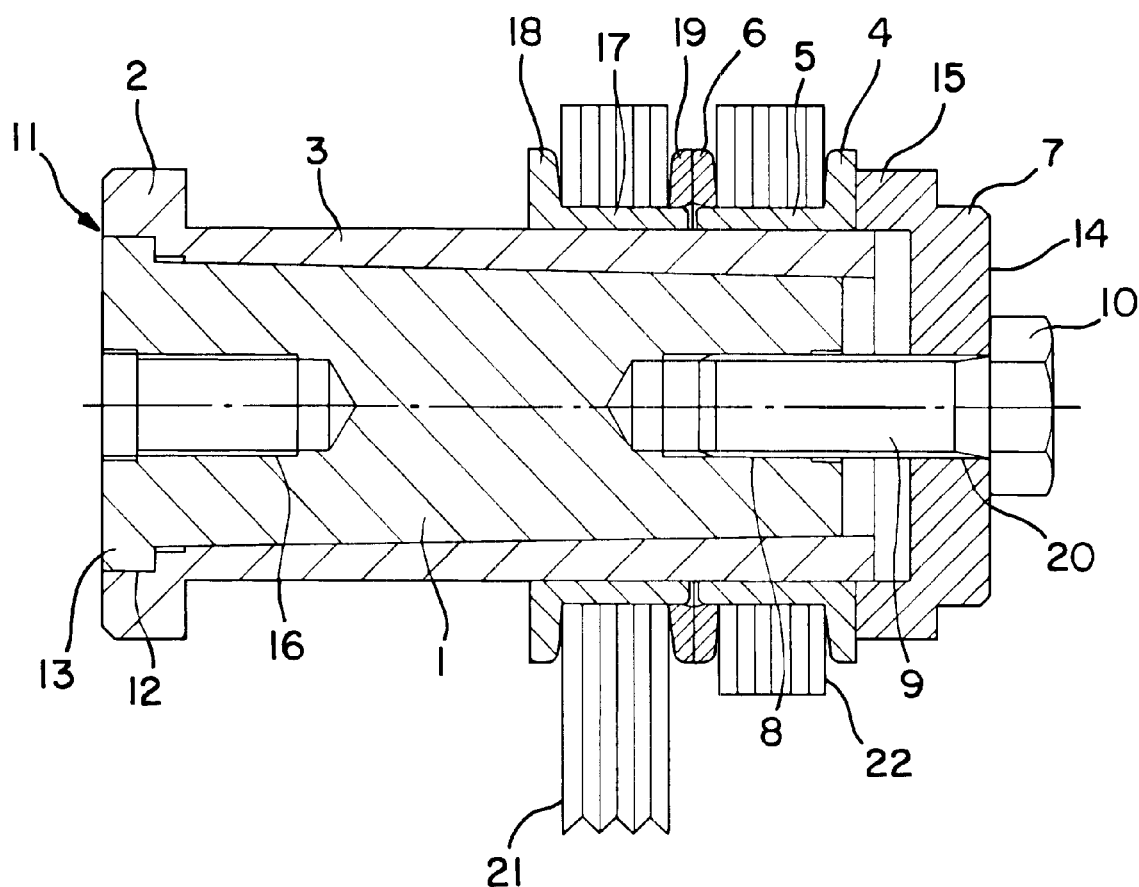
FIG. 1 shows a longitudinal section through a conical screw connection according to this invention in an assembled condition.

The conical screw connection has a tension bolt 1 and a first spring collet 3 arranged on the former and having a collar 2, with the seat between tension bolt 1 and spring collets 3 being conical in shape. The spring collet 3 has a cylindrical lateral surface and is inserted into a borehole of the connecting flange (not shown) of the shaft coupling, with the collar 2 of the spring collet 3 being in contact with the flange.

A second spring collet 5 and a third spring collet 17 are arranged on the cylindrical lateral surface of the spring collet 3 and are axially displaceable in the untightened condition of the conical screw connection, i.e., as long as the first spring collet 3 has not yet been widened by the tension bolt 1. The second spring collet 5 and a third spring collet 17 each also have a collar 4 and 18, respectively. Furthermore, they each have a tension ring 6 and 19, respectively. The coupling disks 21 and 22 are pushed in form-fitting manner with their boreholes onto the second and third spring collets 5, 17. In the unclamped condition of the conical screw connection, the coupling disks 21 and 22 on the cylindrical lateral surface of the second and third spring collets 5, 17 have an axial clearance between themselves.

On the second spring collet 5 there is a tension element 7 having a borehole 20 into which a clamping screw 9 is inserted. Clamping screw 9 is screwed into a threaded borehole 8 designed in the center axis of tension bolt 1. The head 10 of screw 9 supported on the base 14 of tension element 7 has a collar 15 which surrounds the first spring collet 3 with a radial clearance and with which it is in contact with the second spring collet 5. By tightening the screw 9, the coupling disks 21 and 22 are clamped axially between the collar 4, 18 of the respective spring collet 5, 17 and the respective tension ring 6, 19, with the collar 18 of the third spring collet 17 being supported on the connecting flange of the coupling (not shown).

It can be seen that a cylindrical shoulder 12 is designed on the insertion opening of the first spring collet 3, wherein the tension bolt 1 has a cylindrical collar 13 which is held in the shoulder 12. The inside diameter of the cylindrical shoulder 12 is slightly smaller than the outside diameter of the collar 13. Thus, according to the present invention, a force fit or a transition fit 11 is formed between the first spring collet 3 and the tension bolt 1 in such a manner that when the clamping screw 9 is tightened, the coupling disks 21 and 22 of the multi-disk set are clamped axially, and then a compressive force acting in the radial direction is created, causing the spring collets 3, 5, 17 to be widened radially. Due to this radial compressive stress, all tolerances between the spring collets 3, 5, 17 and the coupling disks 21 and 22 are compensated, and thus the respective screw point is reinforced.

The drawing also shows that the depth of the cylindrical shoulder 12 in the first spring collet is essentially equal to the width of the collar 13 of tension bolt 1. If the end face of the tension bolt 1 is flush with the end face of the spring collet 3, the maximum radial widening of the spring collets 3, 5, 17 is achieved accordingly. Thus, the measure of tightening of the conical screw connection can be monitored on the basis of the relative positions of the end faces.

On the end opposite the threaded borehole 8, the tension bolt 1 is provided with an additional threaded borehole 16. The two threaded boreholes 8 and 16 have the same thread diameter and thus have essentially the same depth. The second threaded borehole 16 serves to release the conical screw connection. To do so, the clamping screw 9 is loosened and, in combination with the tension element 7, screwed into the opposite threaded borehole 16. The collar 15 of the tension element 7 is supported on the first spring collet 3.

This invention is not limited to the embodiment shown in the drawing. Instead, different variants and modifications are conceivable, making use of the present invention even in fundamental modifications. Thus, for example, only one additional spring collet with the respective tension ring can be arranged on the first spring collet 3.

We claim:

1. A conical screw connection for a shaft coupling including at least two coupling disks, said conical screw connection comprising:

a tension bolt (1) including a cylindrical collar having an outside diameter;

a first spring collet (3) including an insertion opening for receipt of the tension bolt, where the first spring collet surrounds the tension bolt, the first spring collet further including a cylindrical shoulder proximate to the insertion opening and having an inside diameter and an outside diameter, the cylindrical shoulder surrounding the cylindrical collar;

at least one second spring collet (5) supported by the first spring collet and having a collar (4), wherein the at least two coupling disks are securable on the at least one second spring collet;

a first contact area between the tension bolt (1) and the first spring collet (3), the first contact area being conical in shape;

a second contact area between the first spring collet (3) and the second spring collet (5), the second contact area being cylindrical in shape;

a tension element (7) for axially clamping the at least two coupling disks, wherein the tension bolt has a threaded borehole (8) for receipt of a screw (9) whose head (10) is supported on the tension element (7), wherein at least one of a force fit and a transition fit (11) is created between the tension bolt and the first spring collet proximate to the cylindrical shoulder (12) of the first spring collet and the cylindrical collar (13) on the tension bolt, wherein the inside diameter of the cylindrical shoulder (12) is slightly smaller than the outside diameter of the cylindrical collar (13), and wherein by tightening the screw, the at least two coupling disks are clampable axially and the first and second spring collets (3, 5) are widened radially.

2. The conical screw connection according to claim 1, characterized in that the depth of the shoulder (12) is essentially equal to the width of the collar (13) of the tension bolt.

3. The conical screw connection according to claim 1, further including a tension ring (6) associated with the second spring collet, wherein the tension element (7) has a base (14) and a collar (15) projecting above the base and supported on at least one of the collar (4) of the second spring collet and the tension ring (6) so as to encompass the first spring collet (3) at a location opposite the cylindrical shoulder (12) of the first spring collet with a radial clearance.

4. The conical screw connection according to claim 1, characterized in that the second spring collet (5) comprises a tension ring (6), wherein the at least two coupling disks are axially securable between the collar (4) of the second spring collet (5) and the tension ring (6).

5. The conical screw connection according to claim 1, characterized in that the tension bolt has another threaded borehole (16) on an end opposite the first threaded borehole (8).

* * * * *